United States Patent [19]
Gropp et al.

[11] Patent Number: 4,911,206
[45] Date of Patent: Mar. 27, 1990

[54] SUPPORTED FLEXIBLE THIN-WALLED TUBE STRUCTURE

[75] Inventors: Reinhard Gropp, Neuenbürg-Arnbach; Peter Schanz, Karlsruhe, both of Fed. Rep. of Germany

[73] Assignee: Witzenmann GmbH Metallschlauch-Fabrik Pforzheim, Pforzheim, Fed. Rep. of Germany

[21] Appl. No.: 211,350

[22] Filed: Jun. 24, 1988

[30] Foreign Application Priority Data

Jul. 21, 1987 [DE] Fed. Rep. of Germany ....... 3724069

[51] Int. Cl.⁴ .................... F16L 27/10; F16L 51/02
[52] U.S. Cl. .................................. 138/110; 138/106; 138/121; 138/172; 138/178; 285/114; 285/226
[58] Field of Search ............... 138/103, 106, 107, 110, 138/118, 120, 121, 172, 173, 178, 113, 114; 285/114, 226

[56] References Cited

U.S. PATENT DOCUMENTS

| | | | |
|---|---|---|---|
| 1,971,928 | 8/1934 | Zallea | 138/121 |
| 2,707,117 | 4/1955 | Fentress et al. | |
| 2,748,803 | 6/1956 | Guarnaschelli | |
| 2,894,535 | 7/1959 | Hansen | 138/121 |
| 3,842,865 | 10/1974 | Torricelli | 138/121 |
| 4,298,295 | 11/1981 | Bozzo et al. | |
| 4,497,342 | 2/1985 | Wenzel et al. | 138/106 |
| 4,686,963 | 8/1987 | Cohen et al. | 138/120 |
| 4,791,963 | 12/1988 | Gronert et al. | 138/178 |

FOREIGN PATENT DOCUMENTS

2080195 11/1971 France.

OTHER PUBLICATIONS

WIPO Publication WO86/04660.

Primary Examiner—James E. Bryant, III
Attorney, Agent, or Firm—Frishauf, Holtz, Goodman & Woodward

[57] ABSTRACT

Cables supporting and actually limiting excursion of a flexible thin-walled tube are held in position by spacers which are formed with recesses to receive the cables. To permit easy assembly, and eliminate threading the cables on the spacers with the hose in position, the spacers are formed as half-ring elements, coupled together independently of the cables which pass through recesses. The recesses may be tangentially or radially open slits so that the half elements can be slipped over a subassembly of hose and cables, or the recesses can be formed adjacent overlapping or abutting end portions of the half elements. The recesses also may be in the form of through-bores, on which half elements are threaded, the half elements then being fitted against each other around the hose. The half elements are held together either by external rings, interlocked with the half elements, or by overlapping regions, connected together by hook-and-recess connections, welding, adhesive or the like.

19 Claims, 3 Drawing Sheets

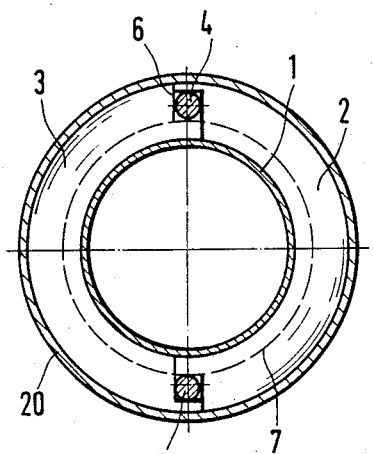
FIG. 1
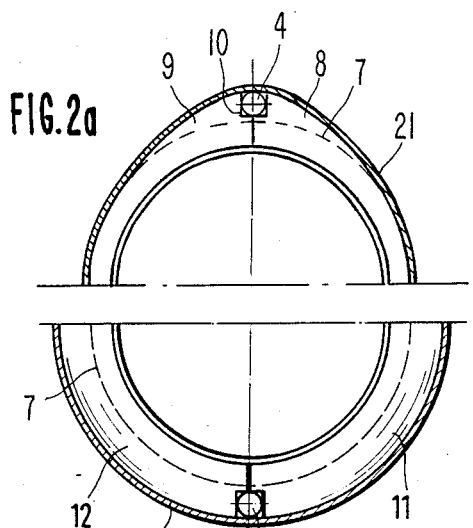
FIG. 2a
FIG. 2b
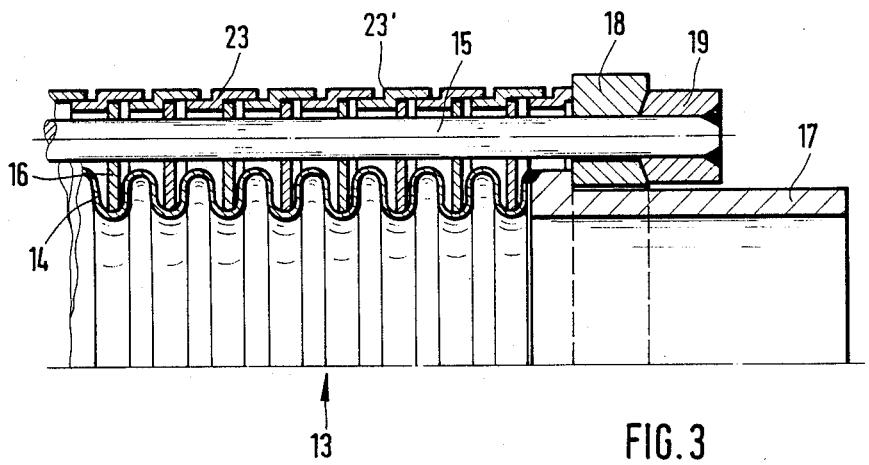
FIG. 3

SUPPORTED FLEXIBLE THIN-WALLED TUBE STRUCTURE

Reference to related application, assigned to the assignee of the present invention, the disclosure of which is hereby incorporated by reference:

U.S. Ser. No. 06/897,523, filed July 15, 1986, GRONERT et al, now U.S. Pat. No. 4,791,963.

The present invention relates to a flexible thin-walled tube or hose structure which is axially supported, and more particularly to an improvement in the structure described in the referenced application Ser. No. 06/897,523, filed July 15, 1986, now U.S. Pat. No. 4,791,963, Gronert et al, of which co-inventor Gropp also is a co-inventor.

DEFINITION

In the specification and claims of this application, the term "cable" will be used to describe a support structure which supports the hose or tube structure in the direction of at least one of: pull or pressure; and in which the cable braces the tube structure as such, to prevent changes in axial spacing of the tube structure upon pressurization or loading. The term "cable" is intended to cover not only the concept of a flexible rope or other elongated element but, also, support structures which, in the same manner, permit the acceptance of longitudinal force. Thus, the cable may be a wire or fiber rope or similar element, a flexible rod, a tape or ribbon, or assembly of tapes or ribbons, a link chain, a linked longitudinal assembly of rod-like link elements which may itself be resistant against bending in given directions or the like. A commercially suitable and preferred form is a metal cable, such as a steel cable; this is not, however, to be considered in a limiting sense and, in order to avoid repetition of functionally equivalent structures, the term "cable" will herein be used in its generic sense as described above.

BACKGROUND

It is known to support flexible hoses which define a tubular, undulating or bellows-like envelope with axially extending cables which are held against the hose by spacer elements fitted into the valleys of the undulation of the hose or tube. Usually, two cables are located outside of the tube, essentially diametrically positioned with respect to each other. The spacers determine the relative position to the hose envelope. The spacers are distributed, in predetermined distances, over the length of the hose. They are formed with holes through which the cables can pass. Desirably, the cables are located in a neutral plane.

The hose structure to which the present invention relates, including the undulations, may be termed generally ring-shaped. The rings need not be circular, since the cross section of the hose may be other than circular, for example oval, or some other non-circular cross section. Such hoses, which are also referred to as bellows elements or bellows hoses, are usually made of metal. In dependence on the intended use, other materials may be employed, such as plastics. The hoses frequently are used to form a flexible connection between two relatively movable elements, and carry media which are to be coupled to the two elements. The medium retained within the flexible hose may be pressurized, with the result that the internal pressurized medium has a tendency to increase the length of the corrugated tube. To prevent such increase in length, the cables which are placed outside of the tube maintain the respective longitudinal spacing of connector ends coupled to the respective elements and, additionally, support the hose against sharp bends, breakage, or lateral escape. The hoses, additionally, may be used to retain or provide protective covering for other media than fluids, for example electrical cables or the like, which are to be connected, for example, between a fixed terminal or junction element and a movable element.

The structure described in the referenced application Ser. No. 06/897,523, Gronert et al, provides for effective support of the hose, so that it will not be subject to friction stresses, and hence wear and tear at rubbing or engaging surfaces between, for example, the tube structures and the cables, or other parts or components. This is particularly important if the hose structure is subjected to changing bending stresses. Frictional engagement of the cables or other parts with the hose structure decrease its lifetime and wearing or rubbing surfaces particularly impair the integrity of the hose structure. The frictional engagement of the cables with the hose itself can be reduced by locating the cables in the neutral bending plane, if this bending plane is invarying, of the hose. No relative movement with respect to the hose, neither in longitudinal nor in circumferential direction, will then result. The spacers then have the function to maintain the cables in the determined relative position to the hose structure itself. Usually, the cables are made in the form of ring disks, fitted into the valleys defined by the undulation of the hose. The disks or spacers are formed with holes through which the cables can pass, thereby positioning the cables with respect to the hose.

The system works well, but it has been found, in assembly, that problems arise with threading the cables through the holes of the spacer disks. This becomes particularly important when one considers that the ends of the cables could be connected to cable end terminal parts only after they have been threaded through all the ring disks which are to be placed around the hose itself. Threading cables which are made of fibers or rope structures of wire is difficult and the danger of unwinding of spiral wires or separation of individual strands of ropes or wire ropes causes difficulty in the manufacture and, further, in the connection between the ends of the ropes and terminal parts themselves. This is particularly important if the lengths of the ropes are precut, so that the terminal parts of the ropes must be held tightly together to permit threading through the spacer holes. The threading operation is difficult and time-consuming and pure manual work. Pre-assembling such reinforced or supported hose structures in automated production is not possible.

THE INVENTION

It is an object to improve a supported flexible thin-walled structure having a corrugated tube form so that it can be easily made, preferably by automatic machinery, and in which problems relating to the assembly of spacers with the hose, and with the cables, themselves, are effectively avoided.

Briefly, the spacers are formed as two half spacer elements, surrounding, for example, approximately half, each, of the circumference of the hose at a valley position of the corrugated hose, the half elements being coupled together independently of the cables. The half elements are each formed with recesses so that they can be placed over the cables or, even, pre-assembled with the cables before the half elements are joined together. Various arrangements to join the half-elements, for example by an external ring, by adhesives, welding, or soldering or brazing of overlapping parts, or by interlocking of the half elements with projecting tabs or the like, may be used.

It is known to make spacer elements of two halves; however, as previously proposed, each half of the rings was formed with bores to permit the cables to pass therethrough so that, even if the half elements were separate, it was the cables that held them together. Consequently, and in accordance with the present invention, and to eliminate the necessity of the cables being threaded through the holes, the spacer elements are coupled together independently of the cables themselves.

The arrangement of the present invention has the advantage that the half spacer elements can be so combined with the cables that the half elements can be readily connected together, not requiring any threading or interengaging coupling with the cables themselves. This has the additional advantage that the cables are not loaded by coupling the spacers together; the spacer halves are coupled together independently of the cables themselves.

The arrangement in accordance with the present invention permits assembly of the cables to the hoses in which the spacer disks are applied either before or after the cables are coupled to end or terminal elements to which, also, the hoses are attached. Alternatively, the spacer elements and the cables can be assembled together as subassemblies, and associated with the corrugated hose or tube structure.

Drawings illustrating various embodiments of the invention:

FIG. 1 is a radial cross-sectional view through a corrugated tube or hose with a split half spacer element;

FIG. 2a is a half radial cross section illustrating another embodiment of a half spacer element;

FIG. 2b is a half radial cross section illustrating yet another embodiment of a half spacer element;

FIG. 3 is an axial cross-sectional view through half of a hose, for example of the type shown in FIG. 1, FIG. 2a, or FIG. 2b;

DETAILED DESCRIPTION

Figure 4:
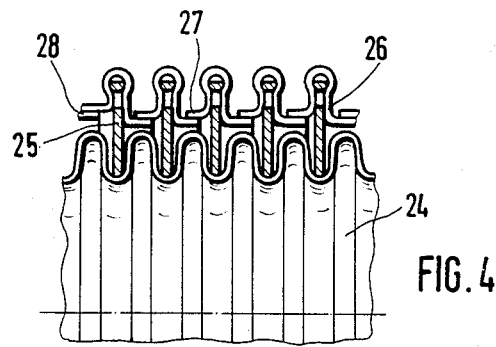
FIG. 4 is a half view, in part radial section, illustrating support for the half spacer elements.

FIG. 1 shows the basic arrangement, in radial cross-sectional view. A corrugated hose, for example with parallel corrugations in ring-shaped wave arrangement, forms a wave valley 1. The wave valley 1 has half spacer elements 2, 3 fitted thereagainst, which receive axially, longitudinally extending cables 4, 5 in recesses formed along butt joints 6. The butt joints 6 are so constructed that the half elements 2, 3 can be placed around the hose valley 1 after the cables 4, 5 are located in position parallel to the hose.

The broken line 7 illustrates the maximum extent of the rise or hill of the corrugated hose.

FIG. 2a shows an embodiment of the invention in which material is saved by constructing the half elements to fit, essentially, within the outline of the hose except in the region where the cables are located. Thus, cable 4 is gripped by one half element 8, fitted against half element 9, to define a butt joint 10 which is located in the region of the cable 4. Again, the half elements, in the region of the butt joint 10, are formed with recesses to accomodate the cable 4.

FIG. 2b illustrates the half elements 11, 12 which extend beyond the outline of the hose. The cables are located at the outer circumference of the half elements 11, 12. More material is used than by the half elements shown in FIG. 2a. FIG. 2b also shows a ring 22 which can surround the half elements. The ring may, for example, have L-shaped outline, with one arm of the L placed against the sides of the spacer elements 11, 12, and the other leg of the L overlapping the spacer elements 11, 12, after they have been placed in position around the cable 5. The second arm of the L is then peened over, or rolled over, or crimped over, at least in parts, thus holding the half elements 11, 12 in position.

FIG. 3 is an axial half cross-sectional view through a hose 13 having corrugations 14, and illustrating an axially extending cable 15. The cables 15 are held in position by half spacer elements 16, for example in accordance with the elements described in connection with FIG. 1, 2a or 2b. The hose is terminated at the end by a coupling or terminating element or terminal 17. The cable 15 is coupled to a terminal 19, for example by end welding as shown schematically, and by a flange or ring 18, fitted against a flange extension on the terminal element 17, connected to the hose, as well known.

FIG. 3 illustrates another feature which is suitably used in connection with the present invention, and particularly if the corrugated hose is subject to dirt or contaminating environments. The ring half elements 2, 3 are held together by an outer ring 20; the ring half elements 8, 9 (FIG. 2a) are held together by an outer ring 21. The ring half elements 11, 12 are held together by an outer ring 22. FIG. 3 illustrates rings 23 which are stepped, and connected together by interengagement of the respective half elements 23. The stepping is shown at 23', resulting in an imbricated scaly arrangement. This imbricated, somewhat flexible cover provides a closed jacket for the hose as such, and protects the hose effectively against external influences. Further, the stepped arrangement of the imbricated rings 23 provides axial limitation of the relative movement of the rings 23 with respect to each other, and thus also limits the bending capability of the flexible hose.

FIG. 4 illustrates another embodiment of the invention, in which the ring half elements 25 of the hose 24 have generally U-shaped—in cross section—retaining rings 26 applied thereto. Retaining rings 26 have axial extensions 27, 28 to provide for limiting axial movability of the hose 24. The cables are not visible in FIG. 4; they are outside of the hose 24, in front of and behind the central line defining the axis of the hose 24.

Figure 5:
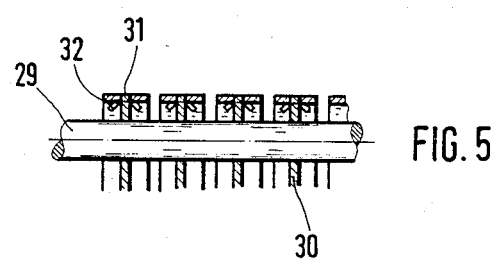
FIG. 5 is a fragmentary view illustrating another embodiment of support for the half spacer element.

FIG. 5 illustrates a simple way of retaining the half elements 30 which hold the cable 29 in position. Rings 31 are placed around the half elements 30, the ring elements 31 being formed with internally extending projections 32, for example punched from material forming the rings 31, to thereby secure the half elements 30 in position, retain them around the hose, and provide for an interengaging fit between the ring 31 and the half element 30.

Figure 6:
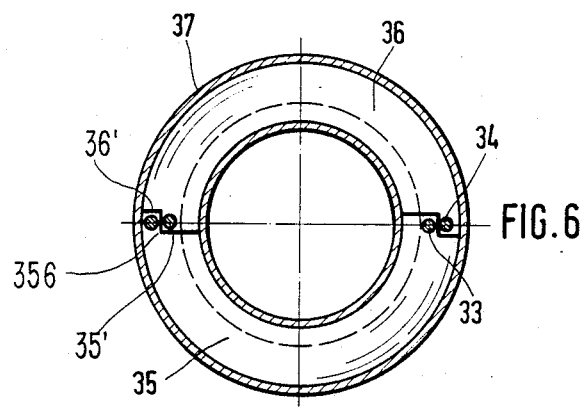
FIG. 6 is a view similar to FIG. 1, illustrating another support for dual cables.

FIG. 6 is a diametrical cross-sectional view in which the cable is formed of two cable strands 33, 34, each, which are held by half elements 35, 36 in respective recesses adjacent the butt joints 35', 36' and 356. A surrounding ring 37 which can be in accordance with any one of the rings 20, 21, 22, 23, holds the half elements 35, 36 together.

Figures 7, 8:
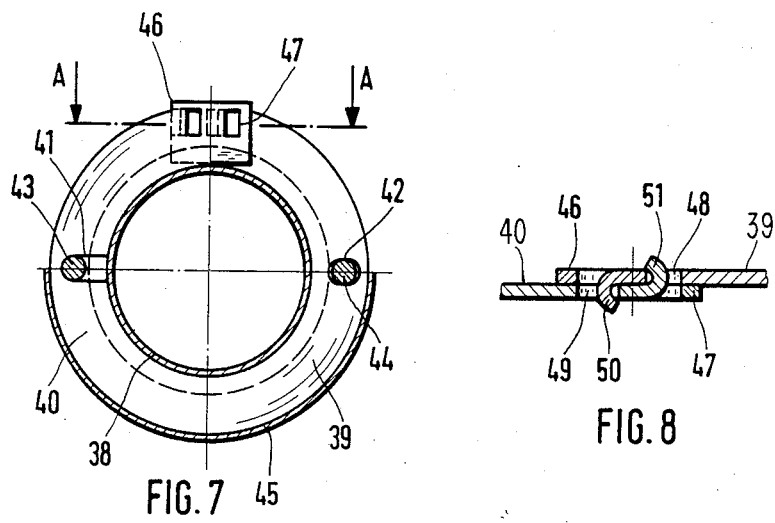
FIG. 7 is a view similar to FIG. 1, and illustrating two ways of connecting the half elements, to be used together and/or separately.
FIG. 8 is a fragmentary view showing connection of the half elements.

FIG. 7 is a radial cross-sectional view in which a hose 38 has half elements 39, 40 set thereagainst. The butt joint is located circumferentially offset from recesses 41, 42 for the cables 43, 44, extending parallel to the hose 38. As shown, the butt joints are offset by 90° from the respective recesses 41, 42.

The half elements 39, 40 are held together by a ring 45, which may be in accordance with a previously described arrangement, and interlocked with the half elements 39, 40.

To provide for additional reliability of holding the half elements 39, 40 together, the half elements are additionally secured together by tabs 46, 47 fitting into openings 48, 49. The tabs overlap and are formed in hook shape, see FIG. 8, to form hooks 50, 51 which interengage with a punch-out region on the other half element, to form holes or openings 48, 49. The tabs interlock and are hooked together, as best seen in FIG. 8.

In some constructions, the ring 45 can be omitted and only the interlocking projecting tab-and-recess arrangement, with the interengaging hooks as shown in FIG. 8, may be used.

FIG. 7 further illustrates that the recesses 41 in the ring half elements 39, 40 may be radially inwardly open on one side. Of course, both diametrically located recesses can be identical. It is of course also possible to form one of the recesses, as shown in FIG. 7 the recess 42, as a closed hole which has a cross-sectional area larger than that of the cable 44. This permits easy threading of the cable 44 on one of the half elements, to form a subassembly which can be fitted laterally on the hose 8, and then the other half element 40 fitted thereagainst, for subsequent interconnection by the tabs 50, 51 fitting into recesses 48, 49 and/or the surrounding ring 45.

Figure 9:
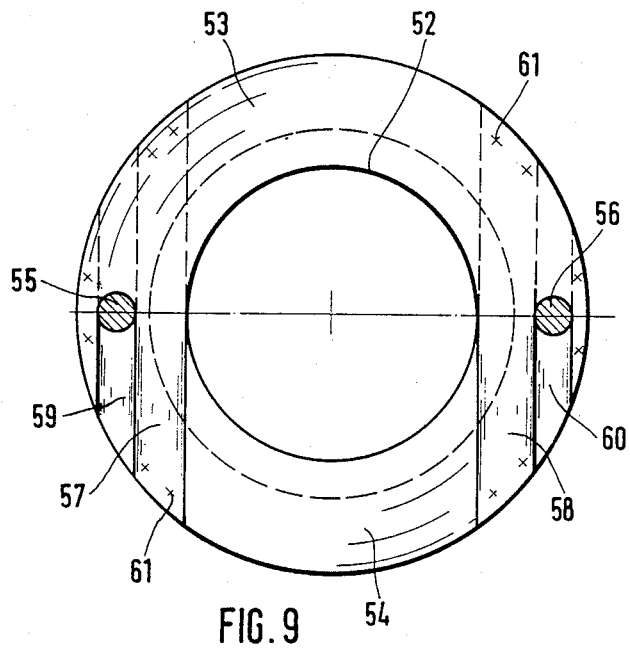
FIG. 9 is a radial view illustrating another embodiment of the half elements and retention of the cables around the hose.

FIG. 9 illustrates another arrangement in which a hose 52 has radially applied half elements 53, 54 which have tangentially extending overlapping projecting tabs 58, 59, starting from the region where the cables 55, 56 are placed, and extending essentially tangentially from the cable placement position. These tab elements 57, 58, each, receive one of the cables 55, 56. The tab elements define longitudinally extending slits 59, 60, which are open towards the outside, and have a width corresponding at least to the width of the cables, so that the cables 55, 56 will fit thereagainst.

After the cables and the hose are assembled, the half elements can merely be slipped on the cables in the regions of the valleys of the corrugations or undulations of the hose. The so made assembly is then connected together by bonding associated immediately adjacent half elements 53, 54, for example by adhesives, welding or soldering. A preferred connection, particularly for hoses requiring strength, is adhering or spot-welding at the locations marked by the x marks as shown by reference numeral 61.

The embodiment of FIG. 1 uses half elements 2, 3 which are butted against each other. This permits manufacture in which the cables 4, 5 can be assembled along the outside of the tube 1, 7 independently of the half elements 2, 3. The half elements are placed entirely or in part against the valleys of the corrugations or undulations of the corrugated hose; they can be applied, however, also later, at any time. It is clearly apparent that the half elements do not require a threading operation of the cables. The recesses formed adjacent the ends of the half elements 2, 3 which abut each other can be so arranged that the cables are entirely surrounded, both at the inside and at the outside. Thus, the recesses of the elements 2, 3 can leave approximately L-shaped ends, so arranged that they interengage against each other. Elements 2, 3 can be identical, with placement against each other reversed end-for-end.

The cable can also be locked in position by forming essentially tangential slits, as seen in FIG. 9. the remaining tabs or strips, adjacent the slits, are covered by the other half element. These slits are open towards the outside, again permitting easy assembly.

To assemble the cables, spacers and tube in the embodiment of FIG. 9, the cables are secured to pass along the hose, for example by attachment to the terminal elements (see FIG. 3); the half elements are then pushed from the side into the valleys of the undulations, one from each respective side, and over the cables, to be then engaged against each other, for example by adhesives, spot-welding or an interengaging hook-and-interlock fit, as illustrated in FIG. 8.

The cables can be formed of individual adjacently placed cable elements—see for example FIG. 6—which are placed either in a common recess or in adjacently formed recesses close to the abutting edges 35', 36' of the respective halves 35, 36, see FIG. 6. This embodiment uses the concept that each one of the half elements can be fitted with one of the respective cable elements which, then, are placed in counter-directed movement against each other from opposite sides of the hose. When the half elements, with the cables thereagainst, come in abutting position, circumferential stresses will be accepted by the respective butt joints and the cables therein; the strands are separated by joint 356.

The recesses for the cables need not be formed at the end portions or edges of the half elements, that is, at the edges at which they fit against each other. As shown in FIG. 7, for example, half elements can be pre-assembled with the cables 42, 43, with the recesses either being open, or substantially larger than the cables so that threading is easy. Cables and half elements 39, 40 then can be formed as subassemblies, or complete subassembly structures, which can be fitted against the circumference of the hose. Of course, the half elements can be connected other than by the cables 42, 43 as shown; they can be connected outside, for example by auxiliary wires, or other filamentary elements, adhered or otherwise secured to the half elements to form a unitary subassembly.

Forming the opening as a closed bore 44 (FIG. 7) has the advantage that the half elements cannot be lost. This forms a suitable combination either with another similar set of half elements or, and as shown in FIG. 7, with a set of half elements having an inwardly open recess 41. Inwardly open recesses have the advantage that, for example, cable 43 is pre-assembled with the hose, whereas cable 42 is pre-assembled with the half elements 39, thus permitting versatile preparation of subassemblies to be joined into the final, reinforced or supported hose.

The half elements must be connected together. In accordance with a feature of the invention, a ring such as ring 20 (FIG. 1) holds them in place, the ring itself being interengaged with the half elements to prevent the ring from sliding off the half elements, for example at the side, or slipping off. The connection between the ring and the half elements may be obtained in various ways, to retain the rings on the half elements in spite of dynamic changes of position, and movement of the hose, and to prevent the ring from slipping off the half elements. The embodiment shown in FIG. 3, in which the rings are imbricated or overlapping to form a scaly appearance, has the advantage that the rings are held together while, additionally, preventing contamination or dirt from affecting the outside of the corrugaged hose structure. The outward appearance will be a continuous, essentially uninterrupted hose, in which the actual pressure or cable carrying hose structure is retained.

By suitably dimensioning the stepped rings 23 (FIG. 3) and the position of the steps 23', movability of the cable in axial direction can be set for a defined dimension. By suitably determining the clearances between adjacent rings, additionally, the bending characteristics of the hose can be determined and influenced.

Interlocking adjacent half elements without rings is shown in the embodiments of FIGS. 7 and 8, by punching out holes adjacent the ends of the half elements which, then, can overlap, as best seen in FIG. 8; tabs 50, 51, which hook against each other, pass through the respective holes 48, 49 and overlap the back edge of the tab of the adjacent half element. The tabs, of course, can also form part of connection plates. If the half elements do not abut against each other at butting ends but overlap, connection of the overlapping portion can be done in accordance with any suitable arrangement, by hooking against each other (FIG. 8), by adhesives, or by welding (FIG. 9, see weld 61). Other arrangements having equivalent functions, or example interlocking projection-and-recess connections, such as dovetails or the like, restrained against lateral escape, can be used.

Various changes and modifications may be made, and features described in connection with any one of the embodiments may be used with any of the other, within the scope of the inventive concept.

We claim:

1. Supported flexible thin-walled tube structure having
   a corrugated tube formed with mutually parallel ring-shaped flutes;
   end connectors (17) at the ends of the tube;
   longitudinal support cables (4, 5; 15; 29; 33, 34; 43, 44; 55, 56) located outside of said tube alongside said tube; and
   spacers (2, 3; 8, 9; 11, 12; 16; 25; 30; 35, 36; 39, 40; 53, 54) filling into the flutes of the tube, said spacers being formed with recesses determining the relative position between the tube and said cables and holding the cables at intervals along the length of the tube,
   said spacers surrounding the tube and retaining said cables in said recesses,
   wherein the spacers comprise
   two half elements coupled together independently of the cables passing through the recesses,
   said half elements surrounding, each, about half of the circumference of said flutes;
   the half elements are formed with projections (57, 58) extending tangentially with respect to the tube and located diametrically opposite each other and overlapping an adjacent half element; and
   wherein said projections are formed with open slits (59, 60) having a width corresponding at least approximately to at least the thickness of said cables (55, 56).

2. The structure of claim 1, wherein the half elements are formed with end surfaces which abut against each other to form abutment surfaces (6, 10).

3. The structure of claim 1, including means (50, 51, 61) for locking together said half elements formed, respectively, on said extending projections and on the half elements.

4. The structure of claim 3, wherein said locking means comprise at least one of: interlocked hook-and-recess means (50, 51); welds (61); adhesives.

5. Supported flexible thin-walled tube structure having
   a corrugated tube formed with mutually parallel ring-shaped flutes;
   end connectors (17) at the ends of the tube;
   longitudinal support cables (4, 5; 15; 29; 33, 34; 43, 44; 55, 56) located outside of said tube alongside said tube; and
   spacers (2, 3; 8, 9;·11, 12; 16; 25; 30; 35, 36; 39, 40; 53, 54) fitting into the flutes of the tube, said spacers being formed with recesses determining the relative position between the tube and said cables and holding the cables at intervals along the length of the tube,
   said spacers surrounding the tube and retaining said cables in said recesses,
   wherein the spacers comprise
   two half elements coupled together independently of the cables passing through the recesses,
   said half elements surrounding, each, about half of the circumference of said flutes;
   externally fitted ring elements (20, 21; 22, 23; 26; 31; 37; 45) are provided, externally surrounding said half elements and holding said half elements together to form a complete ring; and
   wherein means are provided on said ring elements for engaging the respective half elements to hold the ring elements on the half elements and prevent inadvertent removal therefrom.

6. The structure of claim 5, wherein each cable comprises at least two cable strands (33, 34);
   and wherein said recesses are formed adjacent the end portions of said half elements and one each of said two cable strands is located in the recess of one of the half elements.

7. The structure of claim 5, wherein the recesses (44) in the half elements are closed holes larger than the cross-sectional dimension of said cables.

8. The structure of claim 5, wherein the recesses (41) of the half elements (39, 40) are open radially inwardly with respect to the tube (14, 24).

9. The structure of claim 5, wherein the means holding the ring elements in position comprises tab means extending axially with respect to the tube and positioned such that the tab means of any one ring element overlaps the tab means of an adjacent ring means.

10. The structure of claim 5, wherein said elements have, in cross section, a stepped profile;
   and said means holding the ring elements together includes interfitting the rings in imbricated formation to interfit the steps (23') of the rings within each other.

11. The structure of claim 5, wherein the means holding the ring elements include means (27, 28; 23) limiting the relative movement of adjacent rings with respect to the axial direction of the tube (14, 24).

12. The structure of claim 5, wherein the half elements (38, 39) are formed with abutting end portions;
   and wherein said recesses accomodating the cables (42, 43) are located angularly offset from said end portions.

13. The structure of claim 12, wherein said end portions and recesses are, respectively, offset by about 90°.

14. Supported flexible thin-walled tube structure having
   a corrugated tube formed with mutually parallel ring-shaped flutes;
   end connectors (17) at the ends of the tube;
   longitudinal support cables (4, 5; 15; 29; 33, 34; 43, 44; 55, 56) located outside of said tube alongside said tube; and
   spacers (2, 3; 8, 9; 11, 12; 16; 25; 30; 35, 36; 39, 40; 53, 54) fitting into the flutes of the tube, said spacers being formed with recesses determining the relative position between the tube and said cables and holding the cables at intervals along the length of the tube,
   said spacers surrounding the tube and retaining said cables in said recesses,
   wherein the spacers comprise
      two half elements coupled together independently of the cables passing through the recesses,
      said half elements surrounding, each, about half of the circumference of said flutes;
   wherein the half elements (39, 40) are formed with projecting tabs (46, 47) located circumferentially remote from said recesses (41, 42), the tabs of any half element overlapping the tabs of an adjacent half element and said tabs include means for locking the respective tabs together.

15. The structure of claim 11, wherein the half elements (38, 39) are formed with abutting end portions;
   and wherein said recesses accomodating the cables (42, 43) are located angularly offset from said end portions.

16. The structure of claim 15 wherein said end portions and recesses are, respectively, offset by about 90°.

17. The structure of claim 14, wherein the recesses (44) in the half elements are closed holes larger than the cross-sectional dimension of said cables.

18. The structure of claim 14, wherein the recesses (41) of the half elements (39, 40) are open radially inwardly with respect to the tube (14, 24).

19. The structure of claim 14, wherein said locking means comprise at least one of: interlocked hook-and-recess means (50, 51); welds (61); adhesives.

* * * * *